(12) United States Patent
Finkbeiner et al.

(10) Patent No.: US 7,834,488 B2
(45) Date of Patent: Nov. 16, 2010

(54) ELECTRIC LINEAR DRIVE UNIT

(75) Inventors: Matthias Finkbeiner, Mötzingen (DE);
Jürgen Gückel, Filderstadt (DE);
Thomas Feyrer, Esslingen (DE)

(73) Assignee: Festo AG & Co. KG, Esslingen (DE)

( * ) Notice: Subject to any disclaimer, the term of this patent is extended or adjusted under 35 U.S.C. 154(b) by 296 days.

(21) Appl. No.: 12/100,469

(22) Filed: Apr. 10, 2008

(65) Prior Publication Data

US 2008/0252153 A1    Oct. 16, 2008

(30) Foreign Application Priority Data

Apr. 13, 2007   (DE) ................. 10 2007 018 258

(51) Int. Cl.
| H02K 11/00 | (2006.01) |
| H02K 33/00 | (2006.01) |
| H02K 35/00 | (2006.01) |
| H02K 41/00 | (2006.01) |
| H02K 41/02 | (2006.01) |
| H02K 41/03 | (2006.01) |

(52) U.S. Cl. .................. 310/12.01; 310/68 R; 310/71; 310/15; 310/16

(58) Field of Classification Search .................. 310/12, 310/15–39, 71, 68 R; *H02K 11/00, 33/00, H02K 35/00, 41/00, 41/03*
See application file for complete search history.

(56) References Cited

U.S. PATENT DOCUMENTS

| 5,093,593 | A | * | 3/1992 | Philipp | ........................ 310/71 |
| 5,675,195 | A | * | 10/1997 | Takei | ........................ 310/12.21 |
| 5,825,104 | A | * | 10/1998 | Kondo et al. | ............. 310/12.27 |
| 5,864,188 | A | * | 1/1999 | Gerrand et al. | ................. 310/71 |
| 6,297,570 | B1 | * | 10/2001 | Matscheko | ............... 310/12.02 |
| 6,558,038 | B2 | * | 5/2003 | Teramach et al. | ............. 384/45 |
| 6,712,512 | B2 | * | 3/2004 | Teramach et al. | ............. 384/45 |
| 7,091,679 | B2 | * | 8/2006 | Schroeder et al. | ........... 318/135 |
| 2002/0089239 | A1 | * | 7/2002 | Emoto et al. | .................. 310/12 |
| 2005/0068735 | A1 | * | 3/2005 | Fissore et al. | ................ 361/702 |

FOREIGN PATENT DOCUMENTS

| DE | 19605413 A1 | 7/1996 |
| DE | 29705315 U1 | 8/1997 |
| DE | 10244261 A1 | 4/2004 |
| EP | 1150416 A1 | 10/2001 |

* cited by examiner

*Primary Examiner*—Quyen Leung
*Assistant Examiner*—John K Kim
(74) *Attorney, Agent, or Firm*—Hoffmann & Baron, LLP

(57) ABSTRACT

The invention proposes an electric linear drive unit with an electric linear motor that is arranged in or on a basic housing. A sensor device arranged in or on the basic housing serves for determining at least one position of a driving element that is driven by the linear motor. Electric lines are routed from a coil system of the linear motor and from the sensor device to a common connecting point on the basic housing through at least one duct that extends within the basic housing, wherein said electric lines extend through the connecting point to a connector that is arranged at the connecting point and contains connecting means for producing a connection with external lines or cables. The connecting point is sealed by means of an insulating casting- or injection-molding compound at least in the region in which the lines extend from the connecting point.

18 Claims, 2 Drawing Sheets

ELECTRIC LINEAR DRIVE UNIT

CROSS-REFERENCE TO RELATED APPLICATION

This application claims priority based on German Application No. 10 2007 018 258.0 filed on Apr. 13, 2007, which is incorporated herein by reference.

BACKGROUND OF THE INVENTION

1. Field of the Invention

The invention pertains to an electric linear drive unit as known, for example, from EP 1 150 416 A1, DE 102 44 261 A1 or DE 297 05 315 U.

2. Brief Description of the Related Art

A sensor device is usually required for position measuring purposes in order to control or regulate the linear movement or to realize the movement into desired positions. The sensor device, as well as the coil system of the linear motor, needs to be electrically connected or wired. In this respect, it is desirable if the corresponding electric lines can be easily installed and arranged such that they are protected from damage. It should also be possible to easily connect the external lines or cables to be connected thereto.

SUMMARY OF THE INVENTION

The present invention is based on the objective of developing a reliable electric line system for connecting the coil system of the linear motor and the sensor device, which system can be easily installed and connected.

According to the invention, this objective is attained with a linear drive unit.

Since all electric lines are installed in ducts within the basic housing, they are arranged such that they are reliably protected from damage and can be easily installed in the ducts. The common connecting point makes it possible to easily connect external lines and cables by means of a connector. In this respect, the connecting point can be easily and reliably sealed by means of an insulating casting- or injection-molding compound.

Advantageous additional refinements and improvements of the linear drive unit disclosed herein can be realized with the characteristics disclosed herein.

A housing of the connector is mounted in a sealed fashion, particularly by means of screws, at the connecting point with the aid of at least one sealing element such that moisture is effectively prevented from entering between the connector or from the connector to the basic housing.

One particularly advantageous connecting point is formed as a circular disk-shaped recess in the line of the at least one duct, wherein an annular disk as a connecting element to the connector is inserted, particularly screwed, into said recess. This circular disk-shaped recess can be arranged differently along the at least one duct such that the connecting point can be individually positioned in accordance with the respective requirements. The respective connection between the connecting point and the connector can be easily produced with the insertable annular disk.

It is advantageous if the annular disk can be mounted in the recess and/or the connector can be mounted on the annular disk parallel to the corresponding surface of the basic housing in different angular positions such that the outgoing external lines can be configured at arbitrary angles relative thereto. The remounting of the corresponding component makes it possible to quickly and easily change this angle at a later time.

The seal between the housing of the connector and the connecting point is preferably realized by arranging a sealing element between the housing of the connector and the annular disk and a sealing element between the annular disk and the circular disk-shaped recess.

Electric connecting elements for producing a connection between the lines extending out of the basic housing and the external lines are preferably provided in the housing of the connector. The housing of the connector that accommodates the electric connecting elements therefore is sealed such that moisture cannot be admitted therein.

Separate ducts for the electric lines leading to the linear motor and for the electric lines leading to the sensor device are arranged in the basic housing in order to ensure a simple installation and to realize an electric and/or magnetic shield. This also results in a mutual shielding effect, wherein the basic housing consists of an electrically and/or magnetically shielding metal in this case.

BRIEF DESCRIPTION OF THE DRAWINGS

One embodiment of the invention is illustrated in the figures and described in greater detail below. Shown are.

DETAILED DESCRIPTION OF THE PREFERRED EMBODIMENTS

In the embodiment of an electric linear drive unit that is illustrated in the figures, a tubular, elongated motor housing of a linear motor 11 is fixed in a flat, cuboid basic housing 12. In this case, the linear motor extends through the basic housing 12 in a corresponding receptacle channel and protrudes from the basic housing on one side. The linear motor 11 has as a circular cross section, but conceivably could also have other cross-sectional shapes. Furthermore, the linear motor may also be integrated into the basic housing, i.e., the basic housing may form the housing of the linear motor.

Figure 1:
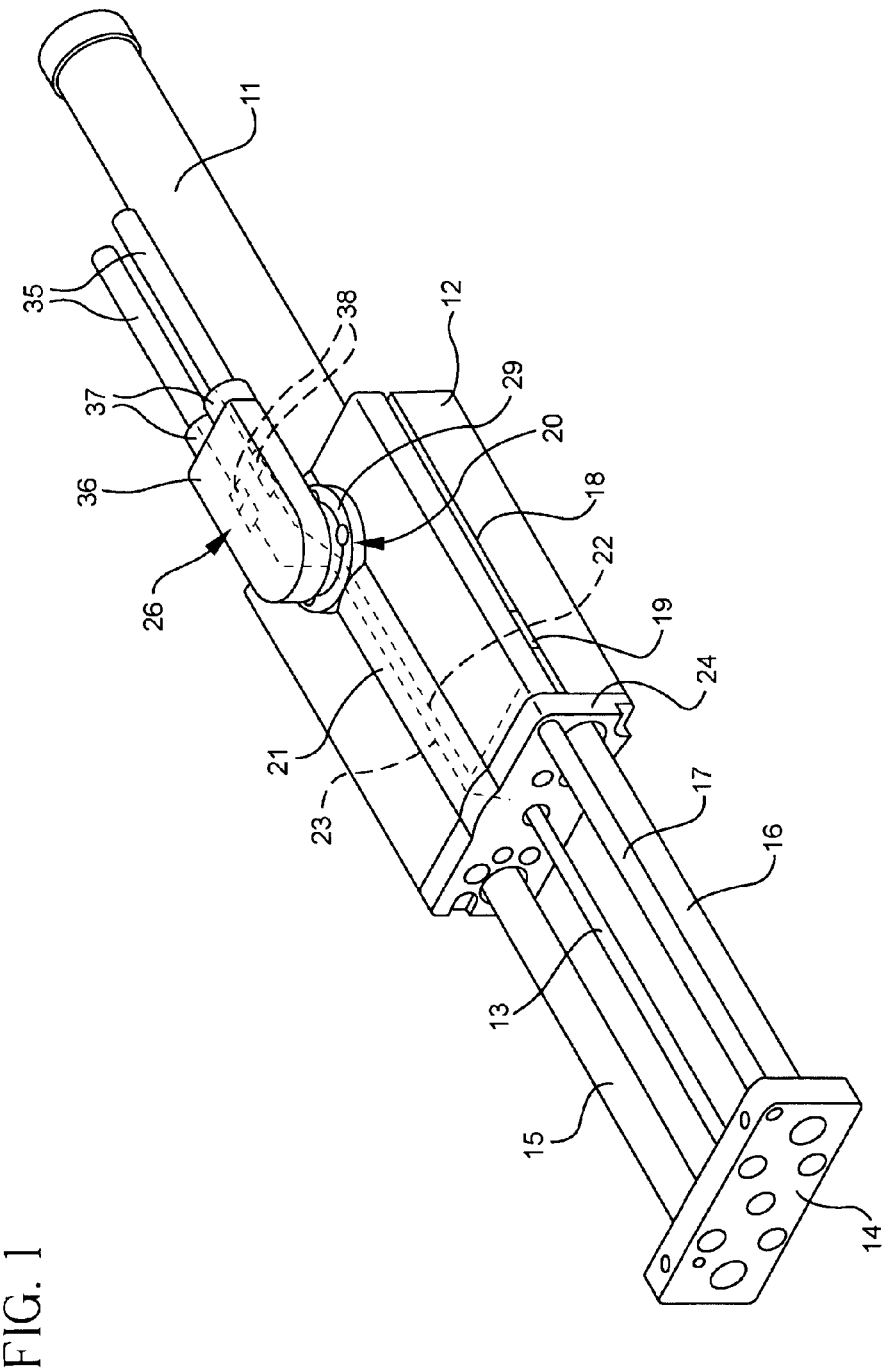
FIG. 1, a perspective representation of an electric linear drive unit with a connector mounted thereon, and FIG. 2, an exploded view of the region of the connecting point that is provided with the connector.

According to the initially cited state of the art, such a linear motor 11 usually consists of a coil system and an armature with a permanent magnet arrangement consisting of several permanent magnets, wherein said armature is guided within the housing of the linear motor 11 such that it can be longitudinally displaced. Naturally, this is not illustrated in the perspective top view shown in FIG. 1. In the embodiment shown, the armature moves within the relatively longer motor housing of the linear motor 11 that features a corresponding long coil system. It would also be possible to realize embodiments with a short coil system in which the longer armature can be displaced out of the housing of the linear motor 11. Conversely, it would be possible to realize embodiments in which the coil system is realized in the form of an armature.

A driving rod 13 is connected to the not-visible armature of the linear motor 11 and extends outward from the housing of the linear motor 11, wherein the opposite end region of said driving rod is fixed on a plate-shaped driving element 14 that, in principle, may be realized in any form.

Two guide rods 15, 16 arranged parallel to both sides of the driving rod 13 are also fixed on the driving element 14 and extend in guide channels of the basic housing 12, whereby they are guided, for example, by means of spherical lining guides or other linear guides. In one alternative embodiment, a different number of guide rods or no guide rods at all may be provided, wherein the driving rod 13 and the armature respectively feature a correspondingly complex bearing arrangement. Embodiments without guide rods are illustrated and described in the initially cited state of the art.

In order to realize the position measurement, a position measuring rod 17 is also fixed on the driving element 14 and extends into the basic housing 12 in a receptacle channel. A position sensor 19 that cooperates with the position measuring rod 17 is arranged in a sensor channel 18 that is realized in the form of an outwardly open groove-like channel extending parallel and adjacent to the aforementioned receptacle channel.

The position measurement can be realized with various known measuring methods. For example, the position measuring rod 17 is magnetized in a strip-shaped fashion or features a magnetic strip that is correspondingly magnetized in a strip-shaped fashion and scanned by the position sensor 19 that is realized in the form of a magnetically sensitive sensor. In addition, a not-shown sensor may be provided for determining one or more reference positions. It would also be conceivable to provide serial arrangements consisting of several magnetically sensitive sensors such as, for example, Hall elements, wherein these magnetically sensitive sensors are either guided past a permanent magnet or such a permanent magnet is a guided past the serial arrangement. The position measuring device may also be arranged on the driving rod 13 or one of the guide rods 15, 16 or integrated into the linear motor 11. In this case, the position measuring device may also be realized in the form of an ultrasonic sensor or microwave sensor. It would even be conceivable to utilize conventional indirect position measuring methods in which voltages or currents of the coil arrangement of the linear motor 11 are measured.

Figure 2:
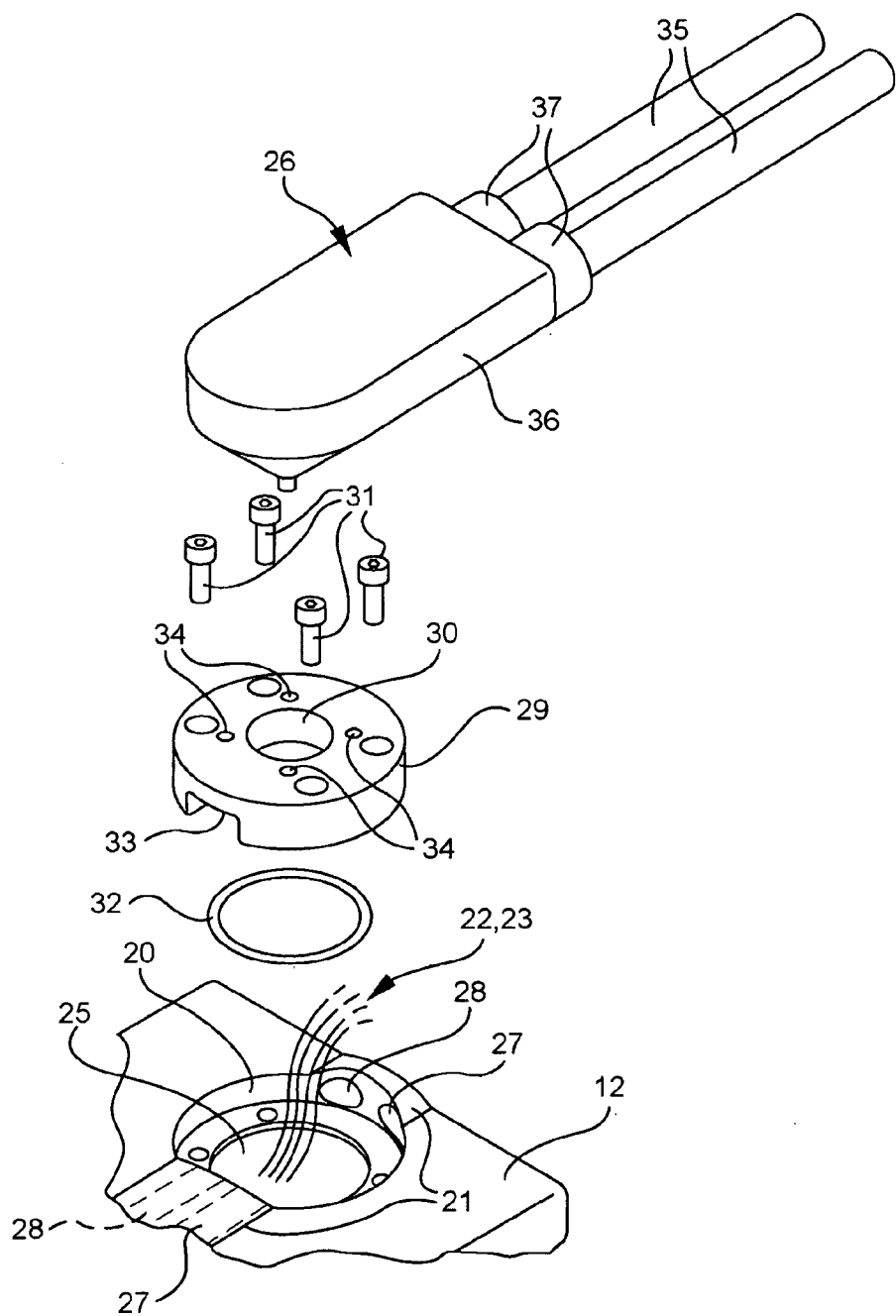

All lines of the linear drive unit extend within the basic housing 12 in ducts 27, 28 that are only partially illustrated in FIG. 2 and end at a common connecting point 20 that is situated on the upper side of the basic housing 12 in the embodiment shown. For this purpose, two separate ducts 27, 28, in particular, centrally extend adjacent to one another in the longitudinal direction of the basic housing 12, namely underneath a rounded elevation 21 that accordingly extends centrally in the longitudinal direction. In this case, the duct 27 serves for accommodating the sensor lines 22 and the other duct 28 serves for accommodating the motor lines 23. In the embodiment shown, the sensor lines 22 consist of lines of the position sensor 19, but it would also be possible to install alternative or additional sensor lines such as, for example, sensor lines of the above-described sensor system or sensor arrangements, temperature sensors and the like. The motor lines 23 consist of electric control lines for the linear motor 11 and, if applicable, corresponding signal feedback lines. Depending on the arrangement of the sensors or connections of the linear motor 11, the lines may also lead to the connecting point 20 from different sides.

In addition to the two central ducts 27, 28 that extend in the longitudinal direction and serve for accommodating the sensor lines 22 and motor lines 23, the basic housing 12 also contains transverse channels required for routing the lines of components arranged adjacent to the central ducts 27, 28 to the central ducts 27, 28. Such transverse channels may be realized, for example, in the form of grooves in one face of the basic housing 12, wherein this face is closed with a housing cover 24 after the installation of the lines.

The connecting point 20 is formed as a circular disk-shaped recess and may be arranged at any point on the upper side of the basic housing 12 along the longitudinally extending ducts 27, 28. This means that the connections between the ducts 27, 28 and the connecting point 20 are produced automatically in this case. After the installation of the lines, the connecting point 20 is sealed with the aid of an insulating casting- or injection-molding compound 25 such that the sensor lines and motor lines 22, 23 are sealed against moisture at the point at which they emerge from the connecting point 20 as shown in FIG. 2. This makes it possible to completely seal the basic housing 12 if the remaining regions and components such as, for example, the sensors, the linear motor 11 and the housing cover 24 should also be sealed accordingly. The ducts 27, 28 themselves do not have to be sealed if sealed components are used, wherein the casting- or injection-molding compound 25 serves for sealing a connector 26 that can be connected to the connecting point 20 and is described below.

In order to install the connector 26, an annular disk 29 with a geometry that corresponds to the recess of the connecting point 20 is initially inserted into said recess. During this process, the sensor lines and motor lines 22, 23 are guided through a central hole 30 of the annular disk 29. The annular disk 29 is fixed in the connecting point 20 with the aid of screws 31, wherein it would also be possible, in principle, to utilize different fixing methods such as, for example, bonding or the like. A ring seal 32 is positioned between the annular disk 29 and a bottom region of the recess of the connecting point 20. If the sensor lines and motor lines 22, 23 laterally extend into the annular disk 29 via a groove-like channel 33 as in the embodiment shown, the fixed annular disk can also be sealed or encapsulated by means of the casting- or injection-molding compound 25. A ring seal 32 is not required in this case.

Subsequently, the connector 26 is mounted on the annular disk 29, for example, with the aid of screws, wherein not-shown sealing means such as, for example, a ring seal may be arranged therebetween. Several symmetrically arranged mounting holes 34 that extend through the connector 26 and that are arranged at uniform angular intervals from one another, namely at respective angular intervals of 90° in the embodiment shown, make it possible to mount the connector 26 in different angular positions such that external cables 35 can lead to the connector from the desired angle.

In a simplified embodiment, the annular disk 29 may also be integrally arranged on the connector 26, wherein an encapsulation of the annular disk 29 is no longer possible in this case such that it needs to be sealed at the connecting point 20 in different positions by means of the ring seal 32. The groove-like channel 33 needs to be eliminated in this case and the sensor lines and motor lines 22, 23 extend centrally out of the connecting point 20 and the encapsulating casting- or injection-molding compound 25 as shown in FIG. 2.

The connector 26 features a sealed housing 36, into which the external cables 35 are inserted through sealing cable lead-throughs 37. The lines of the external cables 35 are connected to the sensor lines and motor lines 22, 23 in the housing 36 by means of electric connecting elements 38.

The basic housing 12 consists, for example, of electrically and/or magnetically shielding metal such that the lines installed in the ducts 27, 28 are shielded accordingly. Lines installed into the different ducts 27, 28 are also mutually shielded.

What is claimed is:

1. An electric linear drive unit with an electric linear motor that is arranged in or on a basic housing and with a sensor device that is arranged in or on the basic housing and serves for determining at least one position of a driving element that is driven by the linear motor, with electric lines that are routed from a coil system of the linear motor and from the sensor device to a common connecting point on the basic housing through at least one duct that extends within the basic housing, wherein said electric lines extend through the connecting point to a connector that is arranged at the connecting point and contains connecting means for producing a connection with external lines or cables, and wherein the connecting point is sealed by means of an insulating casting- or injection-molding compound at least in the region in which the lines extend from the connecting point, the connecting point being realized in the form of a circular disk-shaped recess that is arranged in the line of the at least one duct, wherein an annular disk as a connecting element to the connector is inserted, particularly screwed, into the aforementioned recess.

2. The linear drive unit according to claim 1, wherein a housing of the connector is mounted, particularly with the aid of screws, at the connecting point in a sealed fashion by means of at least one sealing element.

3. The linear drive unit according to claim 1, wherein the annular disk can be mounted in the recess of the connecting point and/or the connector can be mounted on the annular disk parallel to the corresponding surface of the basic housing in different angular positions.

4. The linear drive unit according to claim 1, wherein a sealing element is arranged between the housing of the connector and the annular disk and a sealing element for sealing the annular disk is arranged in the circular disk-shaped recess of the connecting point.

5. The linear drive unit according to claim 4, wherein a casting- or injection-molding compound or a ring seal is used as the sealing element for sealing the annular disk in the circular disk-shaped recess of the connecting point.

6. The linear drive unit according to claim 1, wherein electric connecting elements for producing a connection between the lines extending out of the basic housing and external lines or cables are provided in the housing of the connector.

7. The linear drive unit according to claim 1, wherein the basic housing contains separate ducts for the electric lines leading to the linear motor and for the electric lines leading to the sensor device.

8. The linear drive unit according to claim 1, wherein at least two ducts extend in the longitudinal direction of the basic housing near the surface thereof, wherein said ducts are arranged, in particular, adjacent to one another.

9. The linear drive unit according to claim 1, wherein the basic housing consists of an electrically or magnetically shielding metal.

10. An electric linear drive unit with an electric linear motor that is arranged in or on a basic housing and with a sensor device that is arranged in or on the basic housing and serves for determining at least one position of a driving element that is driven by the linear motor, with electric lines that are routed from a coil system of the linear motor and from the sensor device to a common connecting point on the basic housing through at least one duct that extends within the basic housing, wherein said electric lines extend through the connecting point to a connector that is arranged at the connecting point and contains connecting means for producing a connection with external lines or cables, and wherein the connecting point is sealed by means of an insulating casting- or injection-molding compound at least in the region in which the lines extend from the connecting point, wherein the basic housing contains separate ducts for the electric lines leading to the linear motor and for the electric lines leading to the sensor device.

11. The linear drive unit according to claim 10, wherein a housing of the connector is mounted, particularly with the aid of screws, at the connecting point in a sealed fashion by means of at least one sealing element.

12. The linear drive unit according to claim 10, wherein electric connecting elements for producing a connection between the lines extending out of the basic housing and external lines or cables are provided in the housing of the connector.

13. The linear drive unit according to claim 10, wherein at least two ducts extend in the longitudinal direction of the basic housing near the surface thereof, wherein said ducts are arranged, in particular, adjacent to one another.

14. The linear drive unit according to claim 10, wherein at least two ducts extend in the longitudinal direction of the basic housing near the surface thereof, wherein said ducts are arranged, in particular, adjacent to one another.

15. An electric linear drive unit with an electric linear motor that is arranged in or on a basic housing and with a sensor device that is arranged in or on the basic housing and serves for determining at least one position of a driving element that is driven by the linear motor, with electric lines that are routed from a coil system of the linear motor and from the sensor device to a common connecting point on the basic housing through at least one duct that extends within the basic housing, wherein said electric lines extend through the connecting point to a connector that is arranged at the connecting point and contains connecting means for producing a connection with external lines or cables, and wherein the connecting point is sealed by means of an insulating casting- or injection-molding compound at least in the region in which the lines extend from the connecting point, wherein at least two ducts extend in the longitudinal direction of the basic housing near the surface thereof, wherein said ducts are arranged, in particular, adjacent to one another.

16. The linear drive unit according to claim 15, wherein a housing of the connector is mounted, particularly with the aid of screws, at the connecting point in a sealed fashion by means of at least one sealing element.

17. The linear drive unit according to claim 15, wherein electric connecting elements for producing a connection between the lines extending out of the basic housing and external lines or cables are provided in the housing of the connector.

18. The linear drive unit according to claim 15, wherein the basic housing consists of an electrically or magnetically shielding metal.

* * * * *